United States Patent [19]

Asai

[11] Patent Number: 5,297,951
[45] Date of Patent: Mar. 29, 1994

[54] MOLD FOR PRODUCING MOLDED DISCS

[75] Inventor: Ikuo Asai, Ohbu, Japan

[73] Assignee: Kabushiki Kaisha Meiki Seisakusho, Ohbu, Japan

[21] Appl. No.: 882,012

[22] Filed: May 13, 1992

[51] Int. Cl.$^5$ ............................................. B29C 45/00
[52] U.S. Cl. ................................ 425/556; 264/106; 425/437; 425/810; 425/812
[58] Field of Search ................ 264/106, 107, 328.1; 425/556, 405.1, 437, 444, 810, 812

[56] References Cited

U.S. PATENT DOCUMENTS

| | | | |
|---|---|---|---|
| 3,526,690 | 9/1970 | Bachman | 425/437 |
| 4,085,178 | 4/1978 | McNeely et al. | 264/106 |
| 4,588,369 | 5/1986 | Rascle et al. | 425/437 |
| 4,737,096 | 4/1988 | Poorten | 425/810 |
| 4,795,127 | 1/1989 | Asai | 425/810 |
| 4,917,833 | 4/1990 | Cools | 425/810 |
| 4,961,884 | 10/1990 | Watanabe et al. | 425/810 |
| 4,979,891 | 12/1990 | Kitamura | 425/437 |
| 5,006,058 | 4/1991 | Maruyama et al. | 425/437 |
| 5,092,758 | 3/1992 | Tanaka et al. | 425/810 |
| 5,092,759 | 3/1992 | Lichtinger et al. | 425/810 |

OTHER PUBLICATIONS

Anon., Webster's New World Dictionary, World Pub. Co., Cleveland (1957) p. 907.

Primary Examiner—Charles S. Bushey
Attorney, Agent, or Firm—Oliff & Berridge

[57] ABSTRACT

In a mold for producing a disc having a stationary mold half and a movable mold half, an air passageway is provided in the stationary mold half to feed air into a cavity between the mold halves approximate the center of the disc being molded. Further, two air passageways are provided in the movable mold half to feed air into the cavity between the mold halves. One of the air passageways in the movable mold half feeds air into the cavity proximate the center of the molded disc while the second air passageway feeds air into the cavity proximate the outer periphery of the disc on the side toward the stationary disc. The air fed from the second air passageway of the movable mold half flows around the outer periphery of the disc and behind the disc to assist in separating the disc from the movable mold half. Further, a vacuum passageway is provided in the movable mold half leading to the backside of a stamper, mounted to the face of the movable mold half, to prevent air from the second air passageway of the movable mold half from also flowing around the peripheral edge of the stamper and behind the stamper.

4 Claims, 2 Drawing Sheets

MOLD FOR PRODUCING MOLDED DISCS

BACKGROUND OF THE INVENTION

1. Field of the Invention

The present invention relates generally to a mold for producing, or molding, a disc and, more particularly, to an apparatus for improving the releasability of the disc from the mold.

2. Description of Related Art

Injection molding apparatus for molding a disc has hitherto been performed in such a manner as shown in FIG. 2. A synthetic resin material is injected through a sprue bushing 4 into a cavity 3 defined by a mirror surface 14 of a stationary mold half 1 and a stamper 13 set on a mirror surface 10 of a movable mold half 2 and is molded as a disc 30.

Further, the releasing of the molded disc 30 from the mirror surface 14 and the stamper 13 has been performed by blowing air from a stationary-side air hole A toward the stationary mold half 1 side of the disc 30 and, at the same time, additional air is blown from a movable-side air hole B toward the movable mold half 2 side of the disc 30. Thus, the disc 30 is released respectively from the stamper 13 and the mirror surface 14 of the stationary mold half 1. Thereafter, an ejection bar 7 is moved by ejector pins 9 to eject and release the disc 30.

Although no influence is exerted on the disc 30 at the time of releasing the disc 30 from the mirror surface 14 of the stationary mold half 1 by blowing air from the stationary-side air hole A, when the disc 30 is released from the stamper 13, by the blowing air from the movable-side air hole B, signal pits on the surface of the stamper 13 offer resistance to the air-blow. Thus, in the course of the disc 30 being released from inside to outside (center hole to outer edge), that is, before the air blown from the movable-side air hole B completely reaches around the outermost periphery of the disc, the ejection bar 7 starts to operate.

As a consequence, a boundary line of the air that defines reached and unreached portions between the disc 30 and the stamper 13 appears on the disc. This often results in the appearance of stains on the disc.

SUMMARY OF THE INVENTION

The present invention has been created in the light of the above-described problems and it is an object of the invention to provide a mold for producing a molded disc which is capable of preventing the appearance of any stain marks on the molded disc at the time when the disc is released from the mold.

To accomplish the above-object, the mold for molding the disc according to the present device is so constructed that it comprises a stationary-side air hole opening from a stationary mold half into a disc molding cavity, a first movable-side air hole opening from a movable mold half into the central part of the cavity, a second movable-side air hole opening from the movable mold half toward the surface of an outer peripheral portion of a stamper mounted on a mirror surface of the movable mold half, an annular vacuum groove formed in the reverse side of the outer peripheral edge portion of the stamper, and ejecting means provided in the movable mold half for ejecting a disc molded in the cavity.

With the above structure, air is blown to the stationary mold half side of the surface of the disc from a plurality of stationary-side air holes. At the same time, air is blown to the movable mold half side of the surface of the disc from the movable-side air hole. Further, the reverse side of the stamper is brought into close contact with the stationary mold half by vacuum. Thereafter, the disc is ejected by the ejecting means so as to prevent the appearance of stain marks on the disc at the time when the disc is released from the mold.

DETAILED DESCRIPTION OF THE PREFERRED EMBODIMENT

Figure 1:
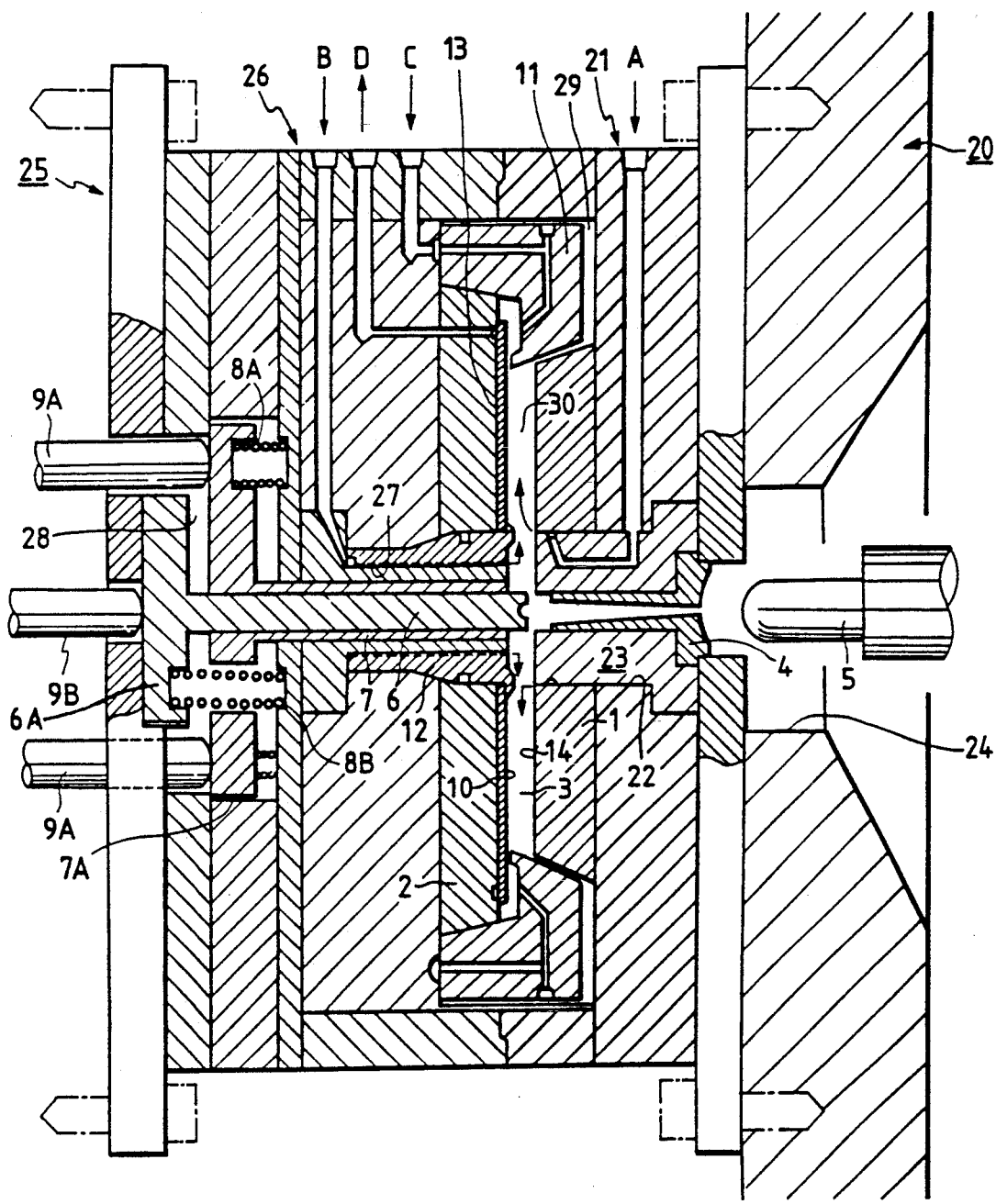
FIG. 1 portrays in sectional view one embodiment of the invention.
Figure 2:
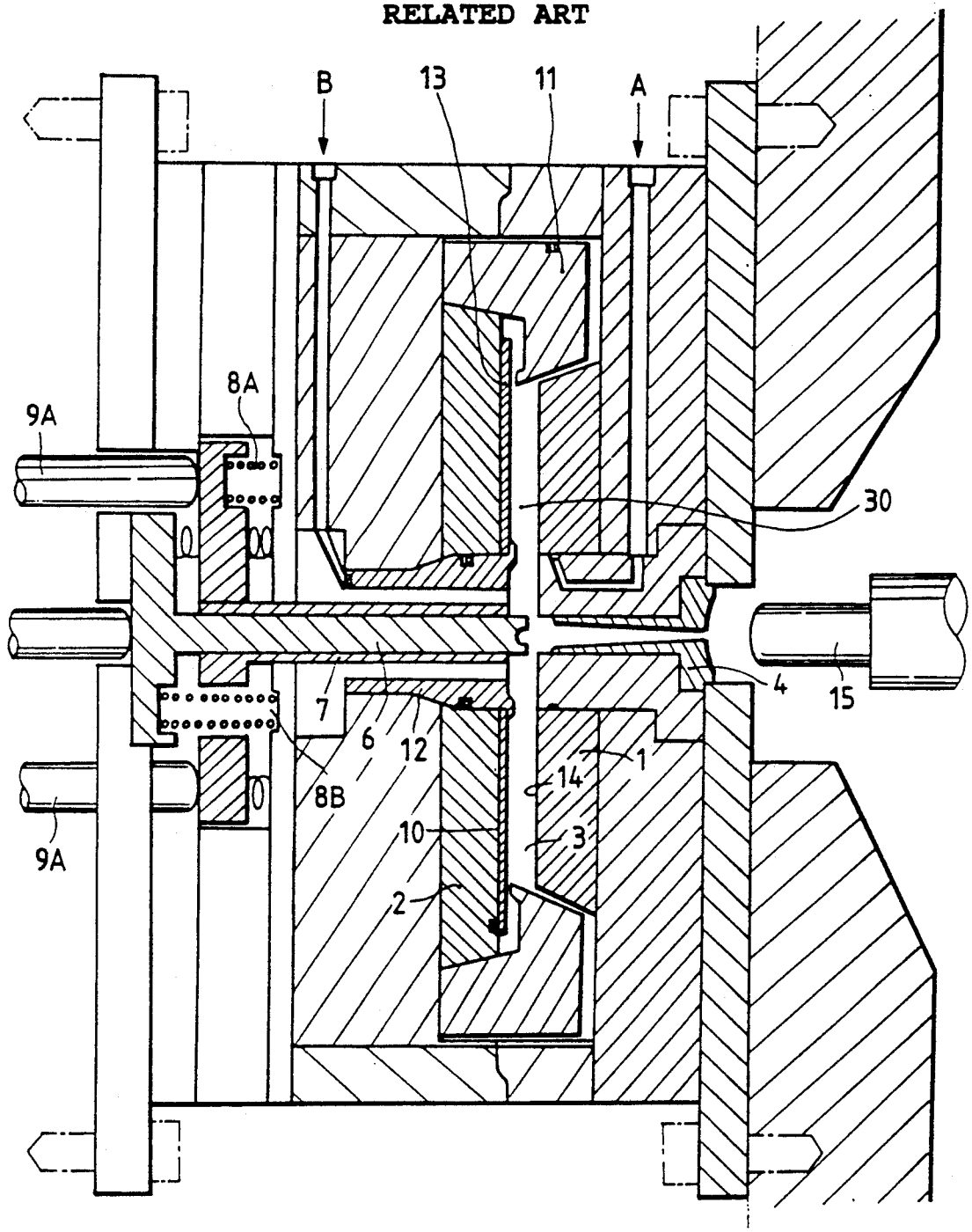
FIG. 2 portrays in sectional view a conventional mold-producing device.

The present device will now be described with reference to FIG. 1 showing one embodiment thereof.

In the figure, reference numeral 1 designates a stationary mold half and reference numeral 2 designates a movable mold half. A cavity 3 is formed between the stationary mold half 1 and the movable mold half 2. The stationary mold half 1 is mounted on a stationary platen 20. An illustration of a mounting means for mounting the stationary mold half 1 to the stationary platen 20 is omitted. A through-hole 22 is formed through the central part of the stationary mold half 1. A female cutter 23 is fitted into this through-hole 22, and a sprue bushing 4 is inserted in a through hole of the female cutter 23. The stationary platen 20 is formed with an opening 24 having a tapered portion. A nozzle 5 is so provided as to be positioned close to, but separated from, the sprue bushing 4 through this opening 24.

The movable mold half 2 is so provided as to move toward or away from the stationary mold half 1 and is mounted on a movable platen 25. Illustrations of mounting means for mounting these members are omitted. The central part of the movable mold half 2 is formed with a through-hole 27 in which a stamper holder 12, an ejection bar 7 and punch 6 are coaxially provided.

A stamper 13 is positioned on a mirror surface 10 of the movable molding half 2 in such a manner that the inner peripheral edge thereof is held against the mirror surface by a L-shaped portion of the stamper holder 12 while the outer peripheral edge of the stamper 13 is held at a delicate or fine space by an outer peripheral ring 11 provided along the outer peripheral portion of the movable mold half 2.

The ejection bar 7 has a large-diameter portion 7A at the rear part thereof. This large-diameter portion 7A is slidably provided in a guide chamber 28 provided within a mold constituting member 26. A plurality of springs 8A are interposed between the front wall of the guide chamber 28 and the front surface of the large-diameter portion 7A and operate in such a direction as the large-diameter portion 7A is separated from the mold constituting member 26. Ejector pins 9A are positioned on the reverse side of the large-diameter portion 7A. These pins 9A advance and retreat with the aid of a drive means and a control means (both not shown).

The punch 6, passing through a central hole of the ejection bar 7, has a rear end thereof the large-diameter portion 6A which is so provided as to slidably move forward and rearward within the guide chamber 28. A plurality of springs 8B are interposed between the large-diameter portion 6A of the punch 6 and the mold constituting member 26 to urge the punch 6 away from the mold constituting member 26. An ejector pin 9B is positioned on the reverse side of the large-diameter portion 6A. This pin 9B advances and retreats with the aid of the drive means and a control means (both not shown).

An air vent 29 is formed between the outer peripheral ring 11 and a member on the side of the stationary mold half 1. This air vent 29 exhausts air, which is compressed by a melted resin injected into the cavity 3, out of the mold.

A stationary-side air hole A is formed to annularly open into the cavity 3 in the vicinity of the center of the mirror surface 14 of the stationary mold half 1. A first movable-side air hole B is formed to annularly open in the cavity 3 along the wall surface of a central hole of the stamper holder 12. Further, a second movable-side air hole C is also formed to annularly open inwardly toward the outer peripheral edge of the stamper 13 through the interior of the outer peripheral ring 11. Further, an annular vacuum groove D is formed to open in the reverse side of the outer peripheral portion of the stamper 13. The mirror surface 10 of the movable mold half 2 is always held in close contact with the stamper 13 so that air from the air hole C can not flow around the reverse side of the stamper 13.

Next, the operation of the mold will be explained. The stationary mold half 1 and the movable mold half 2 are clamped and a melted resin is injected from the nozzle 5 via the sprue bushing 4 into the cavity 3 to thereby form the disc 30. Then, the central part of the disc 30 is holed by the punch 6.

After that, air is blown from the stationary-side air hole A onto the central part of the stationary-side mirror surface 14 and additional air is blown from the movable-side air hole B toward the central part of the disc 30 along the stamper holder 12. At the same time, still more air is blown to the outer peripheral edge of the disc 30 from the second air hole C. Accordingly, the disc 30 is released from the stationary-side mirror surface 14 and the stamper 13 in such a manner that release of the disc progresses from the side of the central part toward the outer peripheral edge thereof and at the same time, it is released from the outer peripheral edge toward the central part thereof, so that the disc 30 is completely released over the entire area of both surfaces thereof by the simultaneously introduced, or blown, air at the center and edges of the disc through air holes A, B and C.

Then, the ejector pin 9A thrusts the large-diameter portion 7A of the ejection bar 7 against the spring 8A to eject the disc 30.

As is apparent from the above-description, the disc release mechanism of the injection molding apparatus according to the present device is structured such that in addition to the conventional stationary- and movable-side air holes, a second movable-side air hole is formed to open inwardly toward the outer peripheral edge of the disc through the interior of the outer peripheral ring and an annular vacuum groove is formed to open at the outer peripheral portion of the rear surface of the stamper and further, the mirror surface of the movable mold half is always held in close contact with the stamper so that the air from the second air hole does not penetrate around to the rear surface of the stamper. Consequently, it is possible to release the disc from the stamper and the mirror surface of the movable mold half completely and instantaneously, and further, since air can be circulated through the entire area around both surfaces of the disc, it is possible to prevent the appearance of any stain marks on the disc when the disc is released from the mold.

What is claimed is:

1. A mold for molding discs, comprising:
   a stationary mold half having a stationary-side air hole opening into a central portion of a cavity for molding a disk;
   a movable mold half having a first movable-side air hole opening toward the central portion of the cavity;
   a second movable side air hole opening through said movable mold half and an outer peripheral ring toward an outer peripheral surface of a stamper fixed onto a mirror surface of the movable mold half;
   an annular vacuum groove opening at an outer peripheral reverse side of said stamper; and
   ejection means provided in said movable mold half for ejecting a disc molded in said cavity, wherein said annular vacuum groove opening holds said stamper in close contact with said movable mold half thereby preventing air from said second movable side air hole from flowing to a reverse side of said stamper.

2. A mold for producing a molded disc, comprising:
   a stationary mold half having a central opening for the injection of moldable material;
   a movable mold half opposing said stationary mold half and having inserted therethrough, at a central position, a hold punch and an ejector; and
   a stamper mounted to an inner face of said movable mold half, wherein said stationary mold half has a first air passageway for blowing air into a mold cavity near a center of the molded disc; and
   said movable mold half has a second air passageway for blowing air from a plurality of openings into a mold cavity near a center of the molded disc on a side opposite to the air blown from said first air passageway, a third air passageway for blowing air near an outer periphery of the molded disc, and a vacuum passageway for holding an outer periphery of said stamper to said inner face of said movable mold half such that blown air from said third air passageway cannot enter between said stamper and said inner face of said movable mold half.

3. The mold as claimed in claim 2, wherein said third air passageway opens toward a side of said stamper facing said stationary mold half at the outer periphery of said stamper so that air blown from said third air passageway passes between said stamper and the molded disc to separate the molded disc from said stamper.

4. The mold as claimed in claim 1, wherein air blown from said second movable side air hold flows around an outer periphery of the molded disc to separate the outer periphery of said molded disc from said stamper.

* * * * *